US012669478B2

(12) United States Patent
Zhao et al.

(10) Patent No.: US 12,669,478 B2
(45) Date of Patent: Jun. 30, 2026

(54) EFFICIENT ULTRASONIC PHASED ARRAY PHASE SHIFT MIGRATION IMAGING METHOD FOR DEFECTS IN MULTI-LAYER STRUCTURE

(71) Applicant: ZHEJIANG UNIVERSITY, Hangzhou (CN)

(72) Inventors: Peng Zhao, Hangzhou (CN); Kaipeng Ji, Hangzhou (CN); Chaojie Zhuo, Hangzhou (CN); Haoran Jin, Hangzhou (CN); Jian Chen, Hangzhou (CN); Jianzhong Fu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 626 days.

(21) Appl. No.: 18/168,728

(22) Filed: Feb. 14, 2023

(65) Prior Publication Data

US 2023/0258604 A1     Aug. 17, 2023

(30) Foreign Application Priority Data

Feb. 14, 2022    (CN) .......................... 202210134843.5

(51) Int. Cl.
| | |
|---|---|
| *G01N 29/06* | (2006.01) |
| *G01N 29/26* | (2006.01) |
| *G01N 29/46* | (2006.01) |

(52) U.S. Cl.
CPC ......... *G01N 29/069* (2013.01); *G01N 29/262* (2013.01); *G01N 29/46* (2013.01); *G01N 2291/0231* (2013.01)

(58) Field of Classification Search
CPC .................... G01N 29/069; G01N 2291/0231
See application file for complete search history.

(56) References Cited

U.S. PATENT DOCUMENTS

| | | | | |
|---|---|---|---|---|
| 10,928,514 | B2 * | 2/2021 | Greco ................. | G01S 7/52028 |
| 2014/0140167 | A1 * | 5/2014 | Hunter ............... | G01S 7/52049 |
| | | | | 367/7 |
| 2024/0288403 | A1 * | 8/2024 | Zhao ................... | G01N 29/069 |

FOREIGN PATENT DOCUMENTS

| | | |
|---|---|---|
| CN | 111248858 A | 6/2020 |
| CN | 112067698 A | 12/2020 |
| CN | 113552219 A | 10/2021 |

OTHER PUBLICATIONS

Albulayli et al. (Jul. 2018). Phase-shift depth migration for plane-wave ultrasound imaging. In 2018 40th Annual International Conference of the IEEE Engineering in Medicine and Biology Society (EMBC) (pp. 911-916). IEEE. (Year: 2018).*

(Continued)

*Primary Examiner* — Stephanie E Bloss
(74) *Attorney, Agent, or Firm* — Getech Law LLC; Jun Ye

(57) ABSTRACT

The present invention provides an efficient ultrasonic phased array phase shift migration imaging method for the defect in a multi-layer structure, including the following steps: (1) transforming full matrix capture data of a multi-layer structure to a frequency-wavenumber domain by means of three-dimensional fast Fourier transform; (2) for any non-traversed layer in the multi-layer structure, extrapolating a surface wave field of the multi-layer structure to an upper interface of the non-traversed layer, to obtain wave field information of the non-traversed layer; (3) according to the obtained wave field information, performing focus imaging on the non-traversed layer in the frequency-wavenumber domain; and (4) repeating the steps (2) and (3), until all layers are traversed, to obtain an imaging result of the multi-layer structure.

6 Claims, 4 Drawing Sheets

(56) References Cited

OTHER PUBLICATIONS

Cheng et al. (2008). Double-square-root-one-way wave equation prestack tau migration in heterogeneous media. Geophysical prospecting, 56(1), 69-85. (Year: 2008).*

Wu et al. (2016). Ultrasonic array imaging of multilayer structures using full matrix capture and extended phase shift migration. Measurement Science and Technology, 27(4), 045401. (Year: 2016).*

CN202210134843.5—First Office Action mailed on Oct. 30, 2024, 20 pages.

Dolmatov et al., Fourier-domain post-processing technique for Digital Focus Array imaging with Matrix phased array for ultrasonic testing of ITER components, Fusion Engineering and Design, vol. 126, Jan. 2018, pp. 124-129.

Liu et al., "Ultrasonic phased array wavenumber imaging algorithm for rail defects", Journal of Applied Acoustics vol. 37, Issue 6, Nov. 30, 2018, 21 pages.

Yang et al., "Array Ultrasound Nondestructive Testing and Evaluation Using Full Matrix: A Review", Aeronautical Manufacturing Technology, vol. 62, Issue No. 14, Jul. 15, 2019, 64 pages.

Yu et al., "A Modified Wavenumber Algorithm of Multi-Layered Structures with Oblique Incidence Based on Full-Matrix Capture" Applied Sciences, vol. 11, Nov. 16, 2021, 17 pages.

Zhang et al., "Research on Defect Detection of Thin Aluminum Plates in the Frequency-Wavenumber Domain", vol. 39, Issue No. 4, Aug. 31, 2020, 15 pages.

Zhao et al. "Research on Fast Ultrasonic Phased Array Imaging of High-performance Polymer Injection Molded Components." Journal of Mechanical Engineering, vol. 58, Issue No. 16, Aug. 31, 2022, 22 pages.

Zhao et al., "Research on Defect Detection in Double-Layer Structures Based on the Full-Matrix Phase Transformation", Jul. 15, 2021, 9 pages.

* cited by examiner (a)                                    (b)

EFFICIENT ULTRASONIC PHASED ARRAY PHASE SHIFT MIGRATION IMAGING METHOD FOR DEFECTS IN MULTI-LAYER STRUCTURE

TECHNICAL FIELD

The present invention belongs to the technical field of detection methods, and particularly relates to an efficient ultrasonic phased array phase shift migration imaging method for defects in a multi-layer structure.

BACKGROUND

To integrate the advantages of different materials, such as high strength, light weight, corrosion resistance, durability, and flexibility, multi-layer structures are used in the fields of buildings, electronics, and aerospace. However, due to complex manufacturing process and severe service process, internal defects are very common in these products, which will greatly damage the mechanical properties of the products and shorten the service life. Common nondestructive testing methods for hole defects in composite products are infrared (IR) thermal imaging and X-ray tomography. The infrared thermal imaging is used to capture a local high temperature at a hole defect to determine a defect location, but cannot be used to determine a defect depth, and has a limited resolution. The X-ray tomography is usually used to reconstruct a hole defect in a product with high accuracy, but complex computation limits its application in engineering practice. In addition, multi-layer structures will be also formed in processing processes of some material processing technologies in which injection molding is the most typical, and melts in a mold cavity and a mold shell form a natural two-layer structure.

Impurities and bubbles in polymer melts are common defects, usually caused by insufficient technological parameters and material contamination, but there is still a lack of effective online testing methods. Therefore, efficient imaging methods for internal defects of multi-layer structures have received extensive attention. Ultrasonic phased array defect imaging technologies have been well developed in the field of nondestructive testing, with high testing efficiency and accuracy, and therefore have been widely used in the testing of concrete or metal structures and products.

At present, phased array signal processing methods have been greatly developed. To maximize the flexibility of phased array signal processing, information should be extracted from phased array sensors as much as possible. With the progress of electronic technologies, full matrix capture (FMC) technologies have aroused wide interest in ultrasonic imaging. Complete time domain signals in each transmitting-receiving pair are captured by the full matrix capture technologies. Compared to other data capture methods, FMC data contains more information, which greatly increases the signal-to-noise ratio of ultrasonic imaging.

Based on time domain (time-space domain) and frequency domain (frequency-wavenumber domain) propagation models of sound waves in uniform media, researchers have proposed various FMC data post-processing methods. A total focusing method (TFM) is a typical time-domain ultrasonic imaging method, which focuses all acoustic beams on corresponding pixels in a target region. The testing sensitivity and image resolution of the TFM for the FMC data are effectively improved, and have become the standards of nondestructive testing. By contrast, the researches on frequency-domain ultrasonic imaging methods for the FMC data are relatively limited. Hunter et al. proposed a Stolt mapping wavenumber algorithm for ultrasonic FMC data, which shows the higher imaging efficiency; and Fan performed time reversal migration using a frequency domain model. However, these methods are only applicable to homogeneous medium.

Researchers have proposed several ultrasonic imaging methods for multi-layer structures. Time-domain ultrasonic imaging methods for multi-layer structures are mainly based on the TFM. A Ray-based TFM algorithm uses a ray-tracing method to compute propagation paths of acoustic beams in multi-layer structures, to obtain time delay of a transmitting-receiving combination at each pixel, and then produce a result with the same imaging conditions as the TFM. However, the complexity of iterative computation of the interface refraction points reduces its imaging efficiency, so a root mean square (RMS) velocity is introduced to avoid the iterative computation of the paths, which is called an RMS-based TFM. Therefore, such method is only applicable to cases where the velocity changes slightly, otherwise the imaging quality will deteriorate seriously. For the frequency-domain ultrasonic imaging methods, Skjelvareid et al. introduced Stolt interpolation, to improve the computational efficiency of PSM algorithms for multi-layer media. In addition, Wu et al. proposed extended phase shift migration (EPSM) to extend multi-layer imaging algorithms to FMC data. Compared to the RMS-based TFM, the accuracy and resolution of imaging results of the EPSM are improved, but the efficiency thereof is lower. Therefore, an efficient and robust ultrasonic imaging FMC algorithm for a multi-layer structure is urgently needed.

SUMMARY

To solve the problems existing in the prior art, the present invention provides an efficient imaging method for the defects in a multi-layer structure using ultrasonic phased array full matrix data. The method greatly reduces computational complexity of ultrasonic full-matrix imaging, and may perform fast focus imaging on the defects in the multi-layer structure.

An efficient ultrasonic phased array phase shift migration imaging method for the defects in a multi-layer structure includes the following steps:

(1) transforming full matrix capture data of a multi-layer structure with defects to a frequency-wavenumber domain by means of three-dimensional fast Fourier transform;

(2) for any non-traversed layer in the multi-layer structure, extrapolating a surface wave field of the multi-layer structure to an upper interface of the non-traversed layer, to obtain wave field information of the non-traversed layer;

(3) according to the obtained wave field information, performing focus imaging on the non-traversed layer in the frequency-wavenumber domain; and (4) repeating the steps (2) and (3), until all layers are traversed, to obtain an imaging result (a defect image) of the multi-layer structure.

In the above imaging method, the full matrix capture data (FMC data) and initialization parameters of the multi-layer structure with the defect are input first and then the full matrix capture data is transformed with the three-dimensional fast Fourier transform (3D-FFT). The full matrix capture data of the multi-layer structure with the defect is measured by phased array sensors.

The initialization parameters include the number N of layers of the multi-layer structure, a sound velocity $c_n$ of each layer, a thickness $d_n$ of each layer, an imaging resolution $\Delta z_n$ of each layer, and a selected frequency band range, where n ranges from 1 to N. The full matrix data serves as three-dimensional data of a position of a receiving unit, a position of a transmitting unit, and a time.

As a preference, in the step (2), the multi-layer structure is traversed in sequence from top to bottom.

As a preference, in the step (2), the surface wave field of the multi-layer structure is extrapolated (subjected to phase shift migration) with a double-square-root vertical wavenumber.

A double-square-root vertical wavenumber of any layer (set as an $m^{th}$ layer) in the multi-layer structure is computed by the following formula:

$$k_{z,m} = -\frac{\omega}{c_m}\left(\sqrt{1 - \frac{k_{rx}^2 c_m^2}{\omega^2}} + \sqrt{1 - \frac{k_{sx}^2 c_m^2}{\omega^2}}\right)$$

where $\omega$ represents a frequency; $c_m$ represents a sound velocity of the $m^{th}$ layer; $k_{rx}$ is the horizontal wavenumber of a receiving element; and $k_{sx}$ is the horizontal wavenumber of a transmitting element.

A computational formula for a wave field at a depth z in a multi-layer medium (the multi-layer structure) is as follows:

$$P(k_{rx}, z, k_{sx}, z, \omega) \propto P(k_{rx}, 0, k_{sx}, 0, \omega) \cdot \Phi(k_{rx}, k_{sx}, z, \omega) = \tag{9}$$

$$D(k_{rx}, k_{sx}, \omega)e^{ik_{z,n}(z-z_{n-1})}\prod_{m=1}^{n-1} e^{ik_{z,m}d_m}$$

where $\Phi(k_{rx},k_{sx},z,\omega)$ is modified phase shift migration; $D(k_{rx},k_{sx},\omega)$ represents a wave field at a top of the multi-layer structure; $k_{z,n}$ represents the wavenumber of the $n^{th}$ layer in a z direction; and $z_{n-1}$ represents a depth of a lower interface of an $(n-1)^{th}$ layer.

As a preference, in the step (3), the non-traversed layer is subjected to focus imaging in the frequency-wavenumber domain with a time t=0 as an imaging condition.

As a preference, an expression of an imaging result I(x,z) with the time t=0 as the imaging condition is as follows:

$$I(x, z) = \int dk_{rx} \int dk_{sx} \int d\omega \left[ D(k_{rx}, k_{sx}, \omega)e^{ik_{z,n}(z-z_{n-1})}\prod_{m=1}^{n-1} e^{ik_{z,m}d_m} \right] e^{i(k_{rx}-k_{sx})x}$$

where $k_{rx}$ is the horizontal wavenumber of a receiving element; i is an imaginary unit; $k_{sx}$ is the horizontal wavenumber of a transmitting element; x represents an arrangement direction of an array of phased array sensors; $\omega$ represents a frequency; $k_{z,n}$ represents the wavenumber of an $n^{th}$ layer in a z direction; z represents an extrapolation depth; $z_{n-1}$ represents a depth of a lower interface of an $(n-1)^{th}$ layer; n ranges from 1 to N, N representing the number of layers of the multi-layer structure; $k_{z,m}$ represents the number of migration waves of an $m^{th}$ layer in the z direction; and $d_m$ represents a thickness of the $m^{th}$ layer.

As a preference, in the step (3), specific operation of performing focus imaging on the non-traversed layer in the frequency-wavenumber domain according to the obtained wave field information includes the following steps:

1) performing layer-by-layer recursion of the wave field in an imaging region according to a resolution of a depth direction, to obtain discrete wave fields of the frequency-wavenumber domain;

2) superposing the obtained discrete wave fields in frequency dimension, to obtain a wave field at a time 0;

3) transforming the wave field at the time 0 from the wavenumber domain to a spatial domain by means of two-dimensional fast Fourier transform; and 4) extracting a wave field corresponding to $x_r=x_s=x$ from the spatial domain as an imaging result of the non-traversed layer, where x represents an arrangement direction of an array of phased array sensors, $x_s$ represents a position of a transmitting element, and $x_r$ represents a position of a receiving element.

In the above imaging method according to the present invention, the double-square-root vertical wavenumber is introduced to carry out phase shift migration (wave field extrapolation), a wave field of a measurement region (the multi-layer structure) is rebuilt in the frequency-wavenumber (f-k) domain, and the defect is subjected to fast and high-quality focus imaging in the frequency-wavenumber domain by directly applying explosive reflection conditions, to obtain the defect image of the multi-layer structure. It is assumed in an explosive reflection model that a received reflection signal is regarded as being actively transmitted when t=0 at a reflection position in the measurement region.

In the efficient ultrasonic phased array phase shift migration imaging method for the defect in a multi-layer structure proposed by the present invention, the FMC data is regarded as the three-dimensional data of the position of the receiving element, the position of the transmitting element, and the time, and is transformed to the frequency-wavenumber (f-k) domain by means of the three-dimensional fast Fourier transform (3D-FFT). Meanwhile, the double-square-root vertical wavenumber is introduced to extrapolate the wave field from the surface to any depth z, and the imaging condition t=0 is directly applied in the f-k domain to generate the defect image. The imaging method only uses two operators of superposition and two-dimensional Fourier transform, and does not need a cross-correlation operator in frequency domain (frequency-wavenumber domain) phase shift migration, which greatly reduces memory requirements and computational complexity. The imaging resolution of the method is the same as that of extended phase shift migration (EPSM), but the computational time thereof is only ⅙ of the latter.

Compared to the prior art, the present invention has the following beneficial effects:

The efficient ultrasonic phased array phase shift migration imaging method for the defect in a multi-layer structure according to the present invention only uses two operators of superposition and two-dimensional Fourier transform, and does not need a cross-correlation operator in frequency-wavenumber domain phase shift migration, which greatly reduces memory requirements and computational complexity, shortens computational time, and improves the imaging efficiency; and the imaging resolution is high.

BRIEF DESCRIPTION OF DRAWINGS

FIG. 1 is a flowchart of an efficient ultrasonic phased array phase shift migration imaging method for the defect in a multi-layer structure according to an embodiment of the present invention, in which:

D represents full matrix data; P represents a sound pressure of a wave field; i represents an imaginary unit; n or m represents a layer of a multi-layer structure; N represents the number of layers of a medium (the multi-layer structure); $c_m$ represents a sound velocity of an $m^{th}$ layer; $k_{z,m}$ represents the wavenumber of the $m^{th}$ layer in a z direction; $d_m$ represents a thickness of the $m^{th}$ layer; $k_r$ represents the horizontal wavenumber of a transmitting element; $k_{rx}$ represents the horizontal wavenumber of a receiving element; In, represents an ultrasonic imaging result corresponding to an $n^{th}$ layer of medium, and the number of corresponding pixels is $M_n \times N_x$; I(x,z) represents a final imaging result, and the number of corresponding pixels is $M_z \times N_x$, where $$M_z = \sum_{n=1}^{N} M_n;$$

$\Delta z_n$ represents a resolution of the z direction; t represents a sampling time; $\omega$ represents a frequency; $M_z$ represents the number of pixels of the imaging result in the z direction; $M_n$ represents the number of discrete layers of the $n^{th}$ layer of medium in the z direction; $N_{x_s}$ represents the number of transmitting elements; $N_{x_r}$ represents the number of receiving elements; for full matrix capture (FMC) data, $N_x = N_{x_r} = N_{x_s}$; $N_t$ represents the number of sampling points in a time domain; and $N_{\omega}$ represents the number of frequency points in a selected frequency band.

Figure 2:
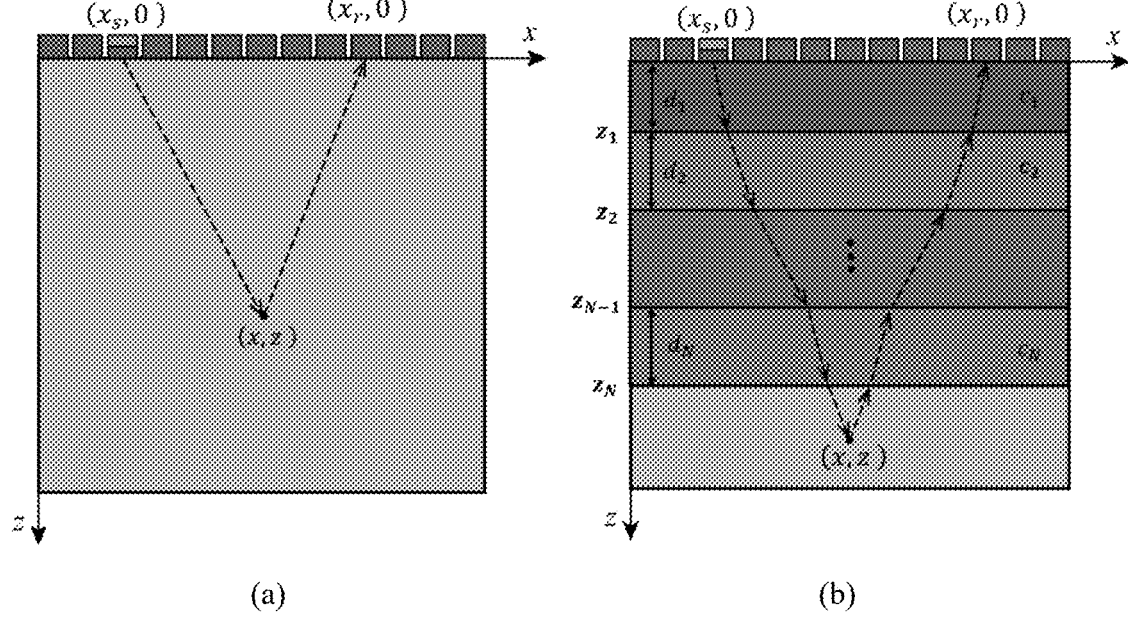

In FIG. 2: (a) is a schematic diagram of ultrasonic phased array full matrix capture of a single-layer structure; (b) is a schematic diagram of ultrasonic phased array full matrix capture of a multi-layer structure; z represents a depth direction; x represents an arrangement direction of an array of phased array sensors; $d_N$ represents a material thickness of an $N^{th}$ layer; $z_N$ represents a position of a lower interface of the $N^{th}$ layer; $x_s$ represents a position of a transmitting element; and $x_r$ represents a position of a receiving element.

Figure 3:
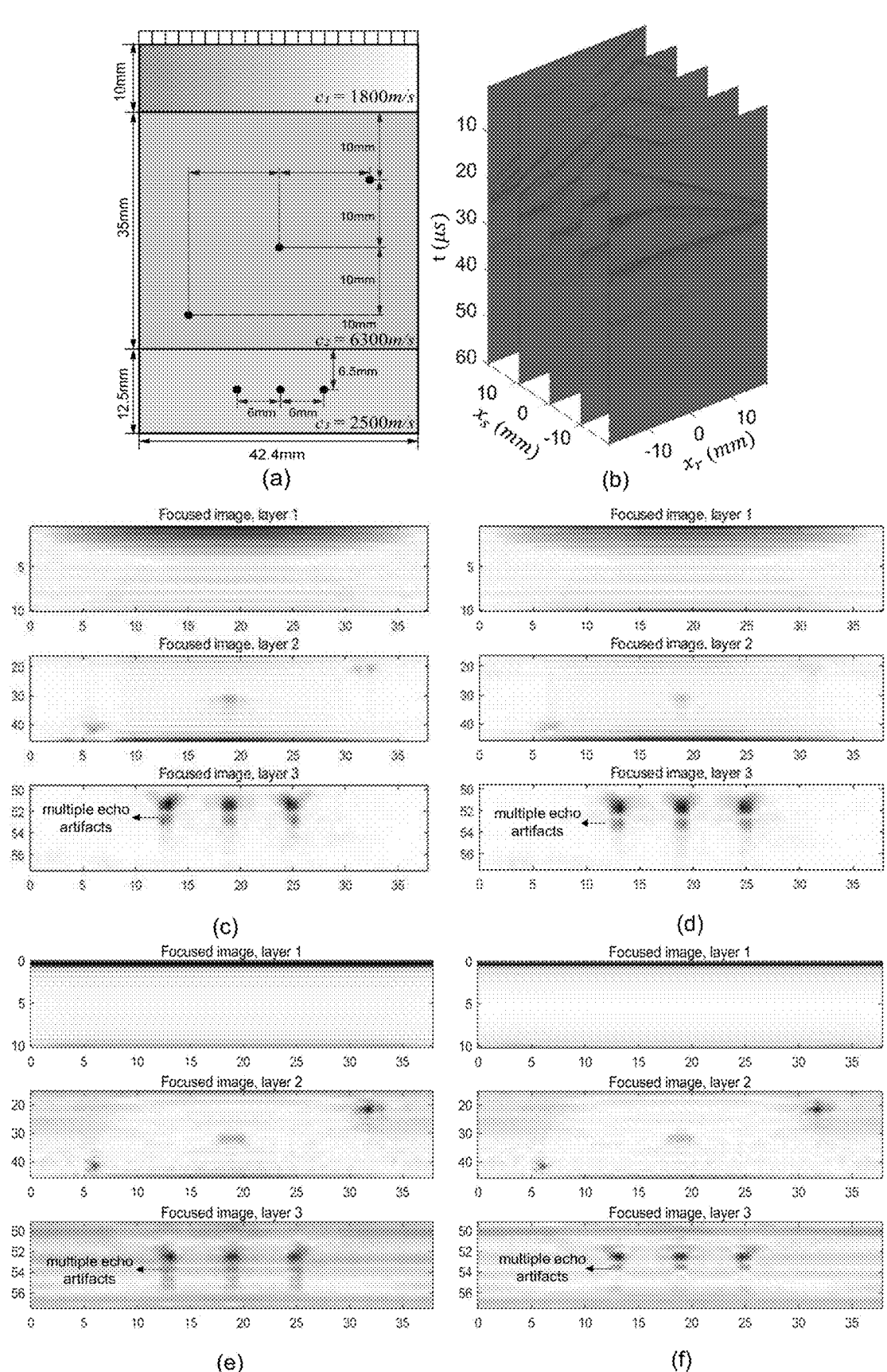

FIG. 3 is a simulation experiment diagram, in which: (a) is a simulation model; (b) is a schematic diagram of FMC data sections; (c) is an imaging result of an Raybased-total focusing method (Raybased-TFM) algorithm; (d) is an imaging result of a root mean square-total focusing method (RMS-TFM) algorithm; (e) is an imaging result of an extended phase shift migration (EPSM) algorithm; and (f) is an imaging result of the method in this embodiment.

Figure 4:
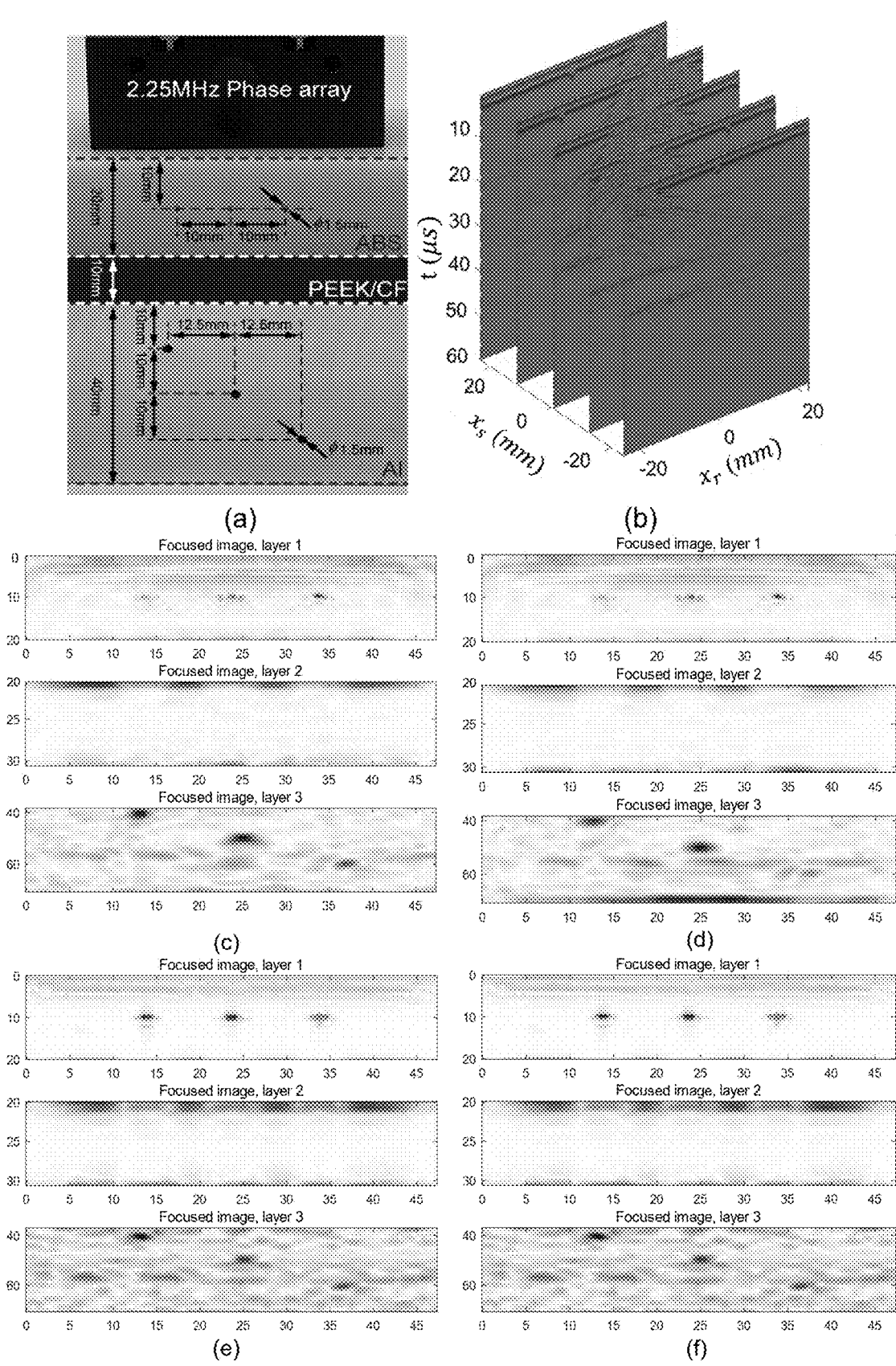

FIG. 4 is an experiment diagram of a three-layer composite structure, in which: (a) is a test block of the three-layer composite structure; (b) is a schematic diagram of FMC data sections; (c) is an imaging result of an Raybased-TFM algorithm; (d) is an imaging result of an RMS-TFM algorithm; (e) is an imaging result of an EPSM algorithm; and (f) is an imaging result of the method in this embodiment.

DETAILED DESCRIPTION OF EMBODIMENTS

An efficient ultrasonic phased array phase shift migration imaging method for the defect in a multi-layer structure includes the following steps:

(1) transforming full matrix capture data of a multi-layer structure with the defect to a frequency-wavenumber domain by means of three-dimensional fast Fourier transform.

(2) for any non-traversed layer in the multi-layer structure, downwardly extrapolating a surface wave field of the multi-layer structure to an upper interface of the non-traversed layer by using a double-square-root vertical wavenumber, to obtain wave field information of the non-traversed layer.

(3) according to the obtained wave field information, performing focus imaging on the non-traversed layer in the frequency-wavenumber domain with t=0 as an imaging condition.

An expression with the time t=0 as the imaging condition is as follows:

$$I(x, z) = \int dk_{rx} \int dk_{sx} \int d\omega \left[ D(k_{rx}, k_{sx}, \omega) e^{ik_{z,n}(z-z_{n-1})} \prod_{m=1}^{n-1} e^{ik_{z,m} d_m} \right] e^{i(k_{rx} - k_{sx})x}$$

where $k_{rx}$ is the horizontal wavenumber of a receiving element; i is an imaginary unit; $k_{sx}$ is the horizontal wavenumber of a transmitting element; x represents an arrangement direction of an array of phased array sensors; $\omega$ represents a frequency; $k_{z,n}$ represents the number of migration waves of an $n^{th}$ layer in a z direction; z represents a depth; $z_{n-1}$ represents a depth of a lower interface of an $(n-1)^{th}$ layer; n ranges from 1 to N, N representing the number of layers of the multi-layer structure; $k_{z,m}$ represents the wavenumber of an $m^{th}$ layer in the z direction; and $d_m$ represents a thickness of the $m^{th}$ layer.

(4) repeating the steps (2) and (3), until all layers are traversed, to obtain a defect image of the multi-layer structure.

Figure 1:
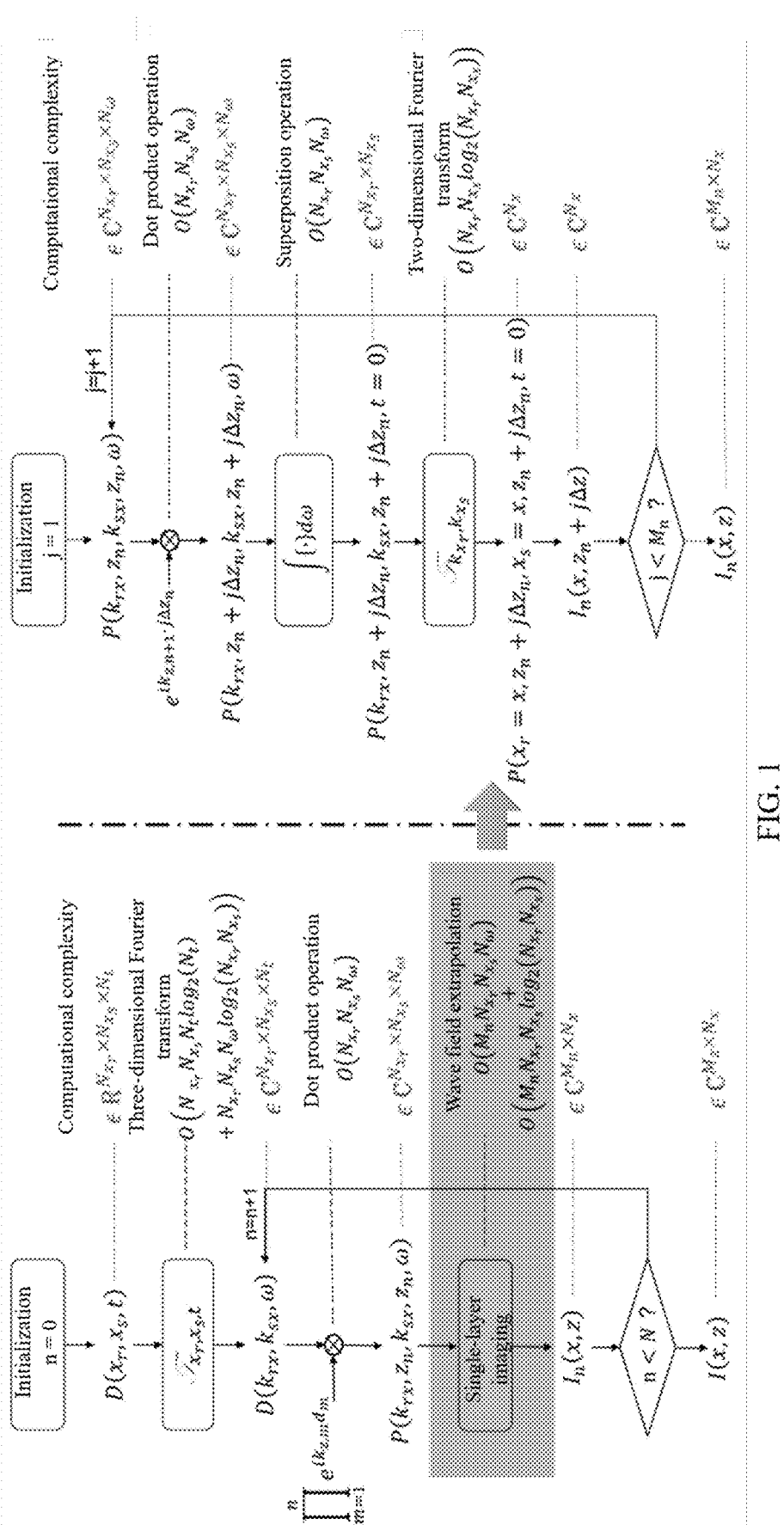

A detailed flowchart of the efficient ultrasonic phased array phase shift migration imaging method for the defect in a multi-layer structure is as shown in FIG. 1. Initialization inputs include full matrix capture (FMC) data of the multi-layer structure, the number N of layers of the multi-layer structure, a sound velocity $c_n$ of each layer, a thickness $d_n$ of each layer, an imaging resolution $\Delta z_n$ of each layer, and a selected frequency band range. First, the FMC data is transformed to the frequency-wavenumber (f–k) domain by means of the three-dimensional fast Fourier transform. Then, a final image I (the defect image) of the multi-layer structure is obtained by performing cyclic imaging on each layer of medium. A wave field at a top of the $n^{th}$ layer is extrapolated by $D(k_{rx}, k_{sx}, \omega)$ through phase shift migration $$\prod_{m=1}^{n} e^{ik_{z,m} d_m},$$

then an internal defect of the layer is imaged, and an imaging result $I_n$ of the layer is output.

An efficient imaging process in single layer is as shown in a right side of FIG. 1. The layer-by-layer recursion of the wave field is performed in the imaging region according to the resolution of the z direction, to obtain discrete wave fields $P(k_{rx}, z_n + j\Delta z_n, k_{sx}, z_n + j\Delta z_n, \omega)$ of a computational region in the frequency-wavenumber (f–k) domain; and the obtained discrete wave fields are superposed in frequency dimension, to obtain a wave field when t=0. The wave field when t=0 is transformed from the wavenumber domain to a spatial domain by means of two-dimensional fast Fourier transform; a wave field corresponding to $x_r = x_s = x$ is extracted from the spatial domain as an imaging result of the layer, where x represents an arrangement direction of an array of phased array sensors; $x_s$ represents a position of a transmitting element; and $x_r$ represents a position of a receiving element. The computational complexity of each step is listed on a right side of the step in FIG. 1.

Theoretical Formula

1. Full Matrix Data

Full-matrix capture (FMC) is used to capture time domain signals among all transmitting-receiving pairs in phased array probes. For an n-vibration-element phased array probe, FMC data contains $n^2$ A-scan signals. $D(x_r, x_s, t)$ represents a signal transmitted from an $s^{th}$ element and received by an $r^{th}$ element at a time t. As shown in FIG. 2, an ultrasonic wave is emitted from a element position $(x_s, 0)$ and is received by a sensor located at $(x_r, 0)$ after being reflected by a scattering point located at $(x, z)$. If a wave field in a time-space domain is represented by $P(x_r, z_r, x_s, z_s, t)$, then a measured wave field at a surface is as follows:

$$P(x_r, 0, x_s, 0, t) = D(x_r, x_s, t) \tag{1}$$

Transformation to a frequency-wavenumber domain by means of three-dimensional fast Fourier transform is as follows:

$$P(k_{rx}, 0, k_{sx}, 0, \omega) = \tag{2}$$
$$D(k_{rx}, k_{sx}, \omega) = \int dx_r \int dx_s \int dt D(x_r, x_s, t) e^{i(k_{sx}x_s - k_{rx}x_r + \omega t)}$$

where $k_{sx}$ is the horizontal wavenumber of a transmitting element; $k_{rx}$ is the horizontal wavenumber of a receiving element; i represents an imaginary unit; $\omega$ represents a frequency; t represents a time; $x_s$ represents a position of the transmitting element; and $x_r$ represents a position of the receiving element. Fourier transform is used to separate waves from the transmitting element to the scattering point and from the scattering point to the receiving element into superposition of single plane wave components.

2. Downward Wave Field Extrapolation

For full matrix data, to extrapolate a wave field from a surface to a depth z, both a transmitted wave field and a received wave field need to be migrated to the depth z, so the wave field at the depth z may be obtained by the following formula:

$$P(k_{rx}, z, k_{sx}, z, \omega) = \int dx_r \int dx_s \int dt D(x_r, x_s, t) e^{i(k_{sx}x_s - k_{rx}x_r + \omega t - k_{sz}z + k_{rz}z)} \tag{3}$$

where $k_{sz}$ is the wavenumber of an excited element in a vertical direction; $k_{rz}$ is the wavenumber of a receiving element in the vertical direction; $x_s$ represents a position of a transmitting element; $x_r$ represents a position of the receiving element; $\omega$ represents a frequency; and t represents a time.

For a uniform medium with a sound velocity of c, as shown in FIG. 2(a), $k_{sz}$ and $k_{rz}$ may be computed by the following formulas:

$$k_{sz} = \frac{\omega}{c}\sqrt{1 - \frac{k_{sx}^2 c^2}{\omega^2}} \tag{4}$$

-continued $$k_{rz} = -\frac{\omega}{c}\sqrt{1 - \frac{k_{rx}^2 c^2}{\omega^2}} \tag{5}$$

Therefore, the wave field at the depth z in the frequency-wavenumber domain may be obtained by performing phase shift migration $\exp(i(k_{rz} - k_{sz})z)$ on a surface wave field, as shown in the following formula:

$$P(k_{rx}, z, k_{sx}, z, \omega) = D(k_{rx}, k_{sx}, \omega) e^{i(k_{rz} - k_{sz})z} \tag{6}$$

Then, the total wavenumber in a vertical direction during downward extrapolation is obtained as follows:

$$k_z = k_{rz} - k_{sz} = -\frac{\omega}{c}\left(\sqrt{1 - \frac{k_{rx}^2 c^2}{\omega^2}} + \sqrt{1 - \frac{k_{sx}^2 c^2}{\omega^2}}\right) \tag{7}$$

where $k_z$ is called a double-square-root vertical wavenumber. When the horizontal wavenumber meets $-\omega/c < k_{rx} < \omega/c$ and $-\omega/c < k_{sx} < \omega/c$, $k_z$ is a real number and $k_z \in [-\omega/c, 0]$. However, when the horizontal wavenumber exceeds the above limit, $k_z$ is an imaginary number and represents evanescent waves that should be filtered out.

In engineering practice, a measurement region is usually not uniform, and may be simplified as a multi-layer structure model, as shown in FIG. 2(b). In this case, an ultrasonic wave passes through N layers of material to reach a defect location and is received by a sensor after being reflected. In the extrapolation process, the amplitude change of the wave as it passes through an interface should be considered, and its effect may generally be modeled by a transmission coefficient that is a function of material impedance and a wave incidence angle. Under the assumption of narrow beams, the change of the transmission coefficient with the incident angle may be ignored. Therefore, there is a proportional relationship between the amplitudes of wave fields above and below the interface, as shown in the following formula (8):

$$P(k_{rx}, z_{\bar{n}}, k_{sx}, z_{\bar{n}}, \omega) \propto P(k_{rx}, z_n^+, k_{sx}, z_n^+, \omega) \tag{8}$$

where $$z_n^- \text{ and } z_n^+$$

represent an upper side and a lower side of a lower interface of an $n^{th}$ layer, respectively. Therefore, a computational formula for the wave field at the depth z in a multi-layer medium (the multi-layer structure) may be corrected as follows:

$$P(k_{rx}, z, k_{sx}, z, \omega) \propto P(k_{rx}, 0, k_{sx}, 0, \omega) \cdot \Phi(k_{rx}, k_{sx}, z, \omega) = \tag{9}$$
$$D(k_{rx}, k_{sx}, \omega) e^{ik_{z,n}(z - z_{n-1})} \prod_{m=1}^{n-1} e^{ik_{z,m}d_m}$$

where $\Phi(k_{rx}, k_{sx}, z, \omega)$ is modified phase shift migration; $D(k_{rx}, k_{sx}, \omega)$ represents a wave field at the top of the multi-layer structure; $k_{z,n}$ represents the wavenumber of the $n^{th}$ layer in a z direction; and $z_{n-1}$ represents a depth of a lower interface of an $(n-1)^{th}$ layer.

The wavenumber $k_{z,m}$ of an $m^{th}$ layer in the z direction is computed by the following formula:

$$k_{z,m} = -\frac{\omega}{c_m}\left(\sqrt{1 - \frac{k_{rx}^2 c_m^2}{\omega^2}} + \sqrt{1 - \frac{k_{sx}^2 c_m^2}{\omega^2}}\right) \tag{10}$$

In fact, the relative amplitude in each layer reflects the defect, because the amplitude scaling effect introduced by the interface has little impact on the image structure and may be ignored.

3. Imaging Conditions

It is assumed in an explosive reflection model that a received reflection signal is regarded as being actively transmitted when t=0 at a reflection position in a measurement region. For B-scan data, a received signal may be directly pushed back to a time zero, but the extra dimension of FMC data complicates it. To ensure that transmitting and receiving elements for downward extrapolation converge at the same location (x,z) to simulate the coincidence of up-going and down-going waves, an imaging condition of full matrix data is defined as follows:

$$I(x, z) = \int P(x, z, x, z, \omega)d\omega \tag{11}$$

where $I(x,z)$ is an imaging result, and $P(x,z,x,z,\omega)$ is obtained by the following formula:

$$P(x, z, x, z, \omega) = \int dk_{rx} \int dk_{sx} P(k_{rx}, z, k_{sx}, z, \omega)e^{i(k_{rx} - k_{sx})x} \tag{12}$$

In combination with the formulas (9), (11), and (12), an imaging condition of full matrix data in a multi-layer medium (a multi-layer structure) is defined as follows:

$$I(x, z) = \int dk_{rx} \int dk_{sx} \int d\omega \left[ D(k_{rx}, k_{sx}, \omega)e^{ik_{zn}(z - z_{n-1})} \prod_{m=1}^{n-1} e^{ik_{z,m}d_m} \right] e^{i(k_{rx} - k_{sx})x} \tag{13}$$

where $k_{rx}$ is the horizontal wavenumber of a receiving element; i is an imaginary unit; $k_{sx}$ is the horizontal wavenumber of a transmitting element; x represents an arrangement direction of an array of phased array sensors; $\omega$ represents a frequency; $k_{z,n}$ represents the wavenumber of an $n^{th}$ layer in a z direction; z represents a depth; $z_{n-1}$ represents a depth of a lower interface of an $(n-1)^{th}$ layer; n ranges from 1 to N, N representing the number of layers of the multi-layer structure; $k_{z,m}$ represents the wavenumber of an $m^{th}$ layer in the z direction; and $d_m$ represents a thickness of the $m^{th}$ layer.

For discrete data, the integration on the frequency $\omega$ may be implemented by a superposition operation, which takes little time. Then, an image $I(x,z)$ is obtained in the wavenumber domain by means of two-dimensional inverse Fourier transform, as shown in the following formula:

$$I(x, z) = \int e^{ik_{rx}x}dk_{rx} \int e^{-ik_{sx}x} dk_{sx}[P(k_{rx}, z, k_{sx}, z, t = 0)] \tag{14}$$

This imaging method only uses two operators of superposition and fast Fourier transform, and does not need a cross-correlation operator in an existing imaging method, so that the memory usage and the computational complexity are greatly reduced.

Testing Experiments

1. Simulation Experiment

To verify the performance of the method in this embodiment, ultrasonic FMC data is obtained in a simulation model of a multi-layer structure. As shown in FIG. 3(a), a first layer simulates a coupling layer or a wedge block commonly used in phased array measurement, and the next two layers are measurement regions with hole defects inside. In the simulation, it is simulated that 64-element phased array sensors with a spacing of 0.6 mm and a center frequency of 5 MHz capture FMC data at a sampling frequency of 50 MHz within a time of 60 us. The simulation is performed in k-wave Matlab 2018b, all computations are carried out on a workstation with configuration of Intel® Core™ i7-8700K CPU@3.70 GHz, and all algorithms are implemented using an MATLAB language.

FMC data $D(x_r, x_s, t)$ is a three-dimensional matrix, and five cross sections are shown in FIG. 3(b) and correspond to signals received by exciting all elements for the $1^{st}$, $16^{th}$, $32^{nd}$, $48^{th}$, and $64^{th}$ excitation, respectively.

FIG. 3(c) to (f) are imaging results obtained by four imaging algorithms, respectively. The four imaging algorithms are a Raybased-total focusing method (Raybased-TFM), a root mean square-total focusing method (RMS-TFM), extended phase shift migration (EPSM), and the method in this embodiment, respectively, which are all used for processing the FMC data to reconstruct a defect image. A frequency band selected by the EPSM and the method in this embodiment ranges from 2 MHz to 8 MHz. To make a fair comparison, the FMC data is filtered by a butter bandpass filter in MATLAB before Raybased-TFM and RMS-TFM processing, to perform a frequency selection process similar to the previous two frequency domain algorithms.

The Ray-based TFM is used for computing a refraction point of each interface by using a Fermat's principle, to accurately compute a wave propagation time. FIG. 3(c) shows an imaging result of the Ray-based TFM, in which a third layer has serious multiple echo artifacts. In addition, ray-tracing computation is very time-consuming, and its computational complexity increases exponentially as the number of layers increases. On the contrary, the RMS-TFM improves the computational efficiency by using an RMS approximate sound velocity. However, its imaging quality is not as good as that of the Ray-based TFM. As shown in FIG. 3(d), the multiple echo artifacts still exist. The EPSM has a result as shown in FIG. 3(e), and it clearly images all defects and suppresses the multiple echo artifacts. The method in this embodiment has an imaging result as shown in FIG. 3(f), and it has the similar imaging quality to the EPSM and suppresses the multiple echo artifacts.

To quantitatively analyze the imaging result, a dimensionless parameter array performance indicator (API) is introduced, as shown in the following formula:

$$API = A_{-6dB}/\lambda^2 \qquad (15)$$

where $A_{-6\ dB}$ is an area in a case where a ratio of the area to a peak of an image of a defect region exceeds −6 dB, and $\lambda$ is the wave number corresponding to the center frequency. Obviously, the smaller the API is, the higher the resolution is. Corresponding average APIs, at a defect point, obtained by different imaging methods are listed in Table 1. The imaging resolution of the method in this embodiment is the same as that of the EPSM, and the imaging resolution of the method for a second layer of defect is higher than that of other time-domain methods.

TABLE 1

Average API of defect imaging results obtained
by different methods in simulation experiment

| Method | Ray-Based TFM | RMS-TFM | EPSM | Method in the invention |
|---|---|---|---|---|
| Second layer | 2.767 | 2.767 | 1.480 | 1.480 |
| Third layer | 4.750 | 4.807 | 4.864 | 4.864 |

The four imaging methods are used to process the FMC data obtained by simulation for six times, and their average computational time and standard deviations are shown in Table 2. The computational time of the method in this embodiment is about ½ of the RMS-TFM, ⅙ of the EPSM, and 1/287 of the Ray-Based TFM, which shows that the method in this embodiment effectively improves the computational efficiency of defect imaging.

TABLE 2

Computational time of different imaging
methods in simulation experiment

| Method | Ray-Based TFM | RMS-Based TFM | EPSM | Method in the invention |
|---|---|---|---|---|
| Time (s) | 214.74 ± 0.169 | 1.76 ± 0.027 | 4.34 ± 0.045 | 0.75 ± 0.012 |

2. Experiment on Three-Layer Composite Structure

To evaluate the effect of the method in this embodiment, a three-layer composite structure is measured. As shown in FIG. 4(a), materials of the three-layer composite structure are acrylonitrile butadiene styrene (ABS), carbon fiber reinforced polyether ether ketone (PEEK/CF), and aluminum, respectively. By using 64-element phased array probes (Shantou Institute of Ultrasonic Instruments) with a center frequency of 2.5 MHz and a element spacing of 0.75 mm, FMC data is captured at a sampling frequency of 50 MHz within a time of 60 us in cooperation with a data capture card 64/64 OEM-PA (AOS. Ltd, America). Several representative slices of the measured FMC data are as shown in FIG. 4(b).

Similarly, experimental data is post-processed with the four imaging methods including the Raybased-TFM, the RMS-TFM, the EPSM, and the method in this embodiment, and the selected frequency band ranges from 0.5 MHz to 5 MHz. The imaging results obtained by the four imaging methods are as shown in FIG. 4(c) to (f), and the average API and time spent for defect imaging using different methods are listed in Table 3 and Table 4, respectively. The average API of the imaging result of the Raybased-TFM is minimum, which indicates that its imaging resolution is higher, but the computational cost of a ray path increases exponentially with the increase of the number of layers and reaches 207.11 s in the experiment. The RMS-TFM shortens the computational time, but its bottom defect imaging resolution is lowest. The imaging results obtained by the EPSM and the method in this embodiment have the same resolution. The method in this embodiment is superior to other three methods in efficiency. The imaging time of the method in this embodiment is about ⅓ of the RMS-TFM, ⅙ of the EPSM, and 1/363 of the Ray-Based TFM.

TABLE 3

Average API of defect imaging results obtained
by different methods in actual experiment

| Method | Ray-Based TFM | RMS-Based TFM | EPSM | Method in the invention |
|---|---|---|---|---|
| First layer | 3.209 | 3.212 | 3.315 | 3.315 |
| Second layer | 6.428 | 8.474 | 6.534 | 6.534 |

TABLE 4

Computational time of different imaging
methods in actual experiment

| Method | Ray-Based TFM | RMS-Based TFM | EPSM | Method in the invention |
|---|---|---|---|---|
| Time (s) | 207.51 ± 0.639 | 2.02 ± 0.026 | 3.18 ± 0.047 | 0.57 ± 0.007 |

The above is only an application example of the present invention and does not limit the applicable range of a tested sample and the type of a measurement sensor. Materials applicable for measurement in the present invention need not and cannot be exhaustively listed herein. Any modifications, equivalent substitutions, improvements, etc. made within the spirit and principle of the present invention should be included within the scope of protection of the present invention.

The invention claimed is:

1. A method for detecting a defect in a multi-layer structure based on efficient ultrasonic phased array phase shift migration imaging, comprising the following steps:

(1) acquiring, by an ultrasonic phased-array sensor, full matrix capture data D $(x_r, x_s, t)$ of a multi-layer structure, wherein $x_s$ represents a position of an $s^{th}$ transmitting element; $x_r$ represents a position of an $r^{th}$ receiving element, D $(x_r, x_s, t)$ represents a signal transmitted from the $s^{th}$ transmitting element and received by the $r^{th}$ receiving element at a time t;

(2) transforming, by a processor, the full matrix capture data D $(x_r, x_s, t)$ to a frequency-wavenumber domain wavefield data D $(k_{rx}, k_{sx}, \omega)$ by means of three-dimensional fast Fourier transform, wherein $k_{rx}$ represents a horizontal wavenumber of a receiving element, $k_{sx}$ represents a horizontal wavenumber of a transmitting element, and $\omega$ represents a frequency;

(3) for a non-traversed layer in the multi-layer structure, extrapolating, by the processor, a surface wave field of the multi-layer structure to an upper interface of the non-traversed layer, to obtain wave field information of the non-traversed layer;

(4) according to the obtained wave field information, performing, by the processor, focus imaging on the non-traversed layer in the frequency-wavenumber domain;

(5) repeating, by the processor, the steps (3) and (4), until all layers are traversed, to obtain an imaging result of the multi-layer structure; and (6) determining a defect in a multi-layer structure based on the imaging result.

2. The method according to claim 1, wherein in the step (3), the multi-layer structure is traversed in sequence from top to bottom.

3. The method according to claim 1, wherein in the step (3), the surface wave field of the multi-layer structure is extrapolated with a double-square-root vertical wavenumber.

4. The method according to claim 1, wherein in the step (4), the non-traversed layer is subjected to focus imaging in the frequency-wavenumber domain with a time t=0 as an imaging condition.

5. The method according to claim 4, wherein an expression of an imaging result I(x, z) with the time t=0 as the imaging condition is as follows:

$$I(x, z) = \int dk_{rx} \int dk_{sx} \int d\omega \left[ D(k_{rx}, k_{sx}, \omega) e^{ik_{z,n}(z - z_{n-1})} \prod_{m=1}^{n-1} e^{ik_{z,m} d_m} \right] e^{i(k_{rx} - k_{sx})x}$$

wherein $k_{rx}$ is the horizontal wavenumber of a receiving element; i is an imaginary unit; $k_{sx}$ is the horizontal wavenumber of a transmitting element; x represents an arrangement direction of an array of phased array sensors; ω represents a frequency; $k_{z,n}$ represents the wavenumber of an $n^{th}$ layer in a z direction; z represents an extrapolation depth; $z_{n-1}$ represents a depth of a lower interface of an $(n-1)^{th}$ layer; n ranges from 1 to N, N representing the number of layers of the multi-layer structure; $k_{z,m}$ represents the wavenumber of an $m^{th}$ layer in the z direction; and $d_m$ represents a thickness of the $m^{th}$ layer.

6. The method according to claim 1, wherein in the step (4), specific operation of performing focus imaging on the non-traversed layer in the frequency-wavenumber domain according to the obtained wave field information comprises the following steps:

1) Performing layer-by-layer recursion of the obtained wave field information in an imaging region according to a resolution of a depth direction, to obtain discrete wave fields of the frequency-wavenumber domain;

2) Superposing the obtained discrete wave fields in frequency dimension, to obtain a wave field at a time 0;

3) Transforming the wave field at the time 0 from the wavenumber domain to a spatial domain by means of two-dimensional fast Fourier transform; and 4) Extracting a wave field corresponding to $x_r = x_s = x$ from the spatial domain as an imaging result of the non-traversed layer, wherein x represents an arrangement direction of an array of phased array sensors, $x_s$ represents a position of a transmitting element, and $x_r$ represents a position of a receiving element.

* * * * *